United States Patent [19]

Colvin et al.

[11] Patent Number: 5,099,575
[45] Date of Patent: Mar. 31, 1992

[54] METHOD FOR CONNECTING A COOLANT TUBE AND HEADER OF A HEAT EXCHANGER

[75] Inventors: James L. Colvin, Mt. Pleasant; Shawn T. Jennings, N. Charleston, both of S.C.; Gary L. Tarzwell, Warren, Mich.

[73] Assignee: McCord Heat Transfer Corporation, Walled Lake, Mich.

[21] Appl. No.: 665,351

[22] Filed: Mar. 6, 1991

[51] Int. Cl.$^5$ .............................................. B23P 15/26
[52] U.S. Cl. ..................................... 29/890.044; 29/512; 29/523; 29/890.052; 72/479
[58] Field of Search ............. 29/890.043, 890.044, 29/890.052, 512, 523; 72/479

[56] References Cited

U.S. PATENT DOCUMENTS

| | | | |
|---|---|---|---|
| 3,017,793 | 1/1962 | Appel | 72/479 |
| 3,780,562 | 12/1973 | Kinley | 72/479 |
| 4,065,953 | 1/1978 | Frentzen et al. | 72/393 |
| 4,134,287 | 1/1979 | Le Huédé et al. | 29/890.043 |
| 4,154,464 | 5/1979 | Stary | 29/890.043 |
| 4,459,917 | 7/1984 | Michael et al. | |
| 4,546,824 | 10/1985 | Melnyk | |
| 4,730,669 | 3/1988 | Beasley et al. | 29/890.043 |
| 4,744,505 | 5/1988 | Calleson | |
| 4,889,105 | 12/1989 | Vago et al. | 29/890.043 |

Primary Examiner—Irene Cuda
Attorney, Agent, or Firm—Reising, Ethington, Barnard, Perry & Milton

[57] ABSTRACT

A method for connecting a coolant tube (20) and header (22, 24) of a heat exchanger (10) comprises manifolds (12, 14) forming fluid reservoirs (16, 18) and a plurality of coolant tubes (20) in fluid communication with the manifolds (12, 14). The manifolds (12, 14) comprise a header wall (22, 24) having a plurality of collars (26) forming collar openings (28). The tubes (20) include an axially extending mechanical seam (50) and deformable hollow end portions (52) extending through the collar openings (28). A flaring tool (70) having tapered side surfaces (74) is inserted in the end portion (52) of the tube (20) to expand the tube (20) outwardly against the collar opening (28). The flaring tool (70) includes a groove extending axially along the side surface (74) aligning with and straddling the seam (50) during expansion of the tube (20) and further forces the portions (62, 64) of the tube (20) adjacent the seam (50) outwardly into sealing engagement with the collar opening (28).

6 Claims, 4 Drawing Sheets

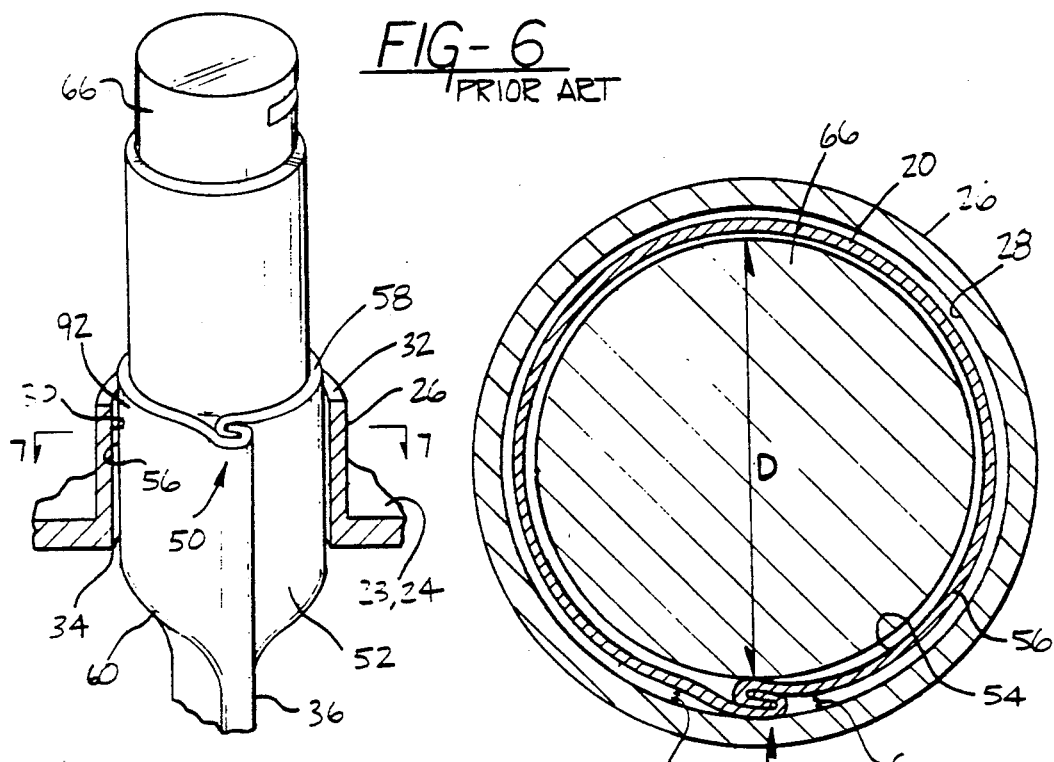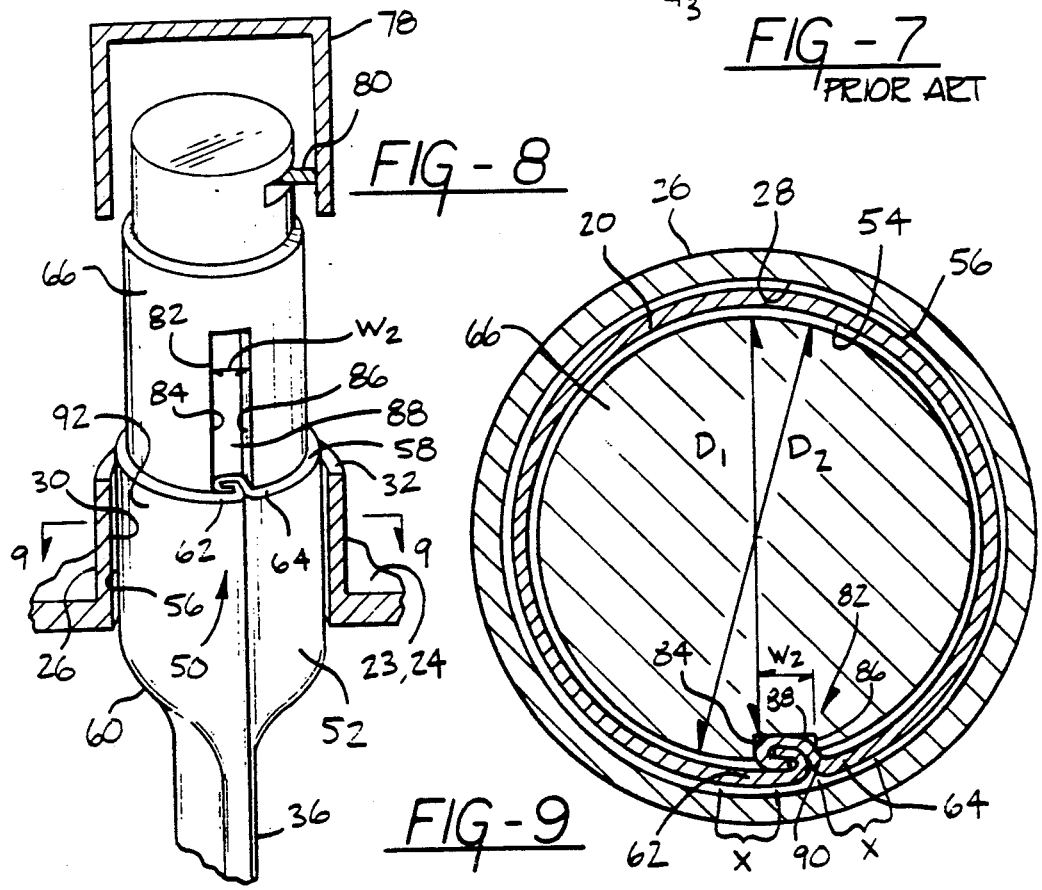

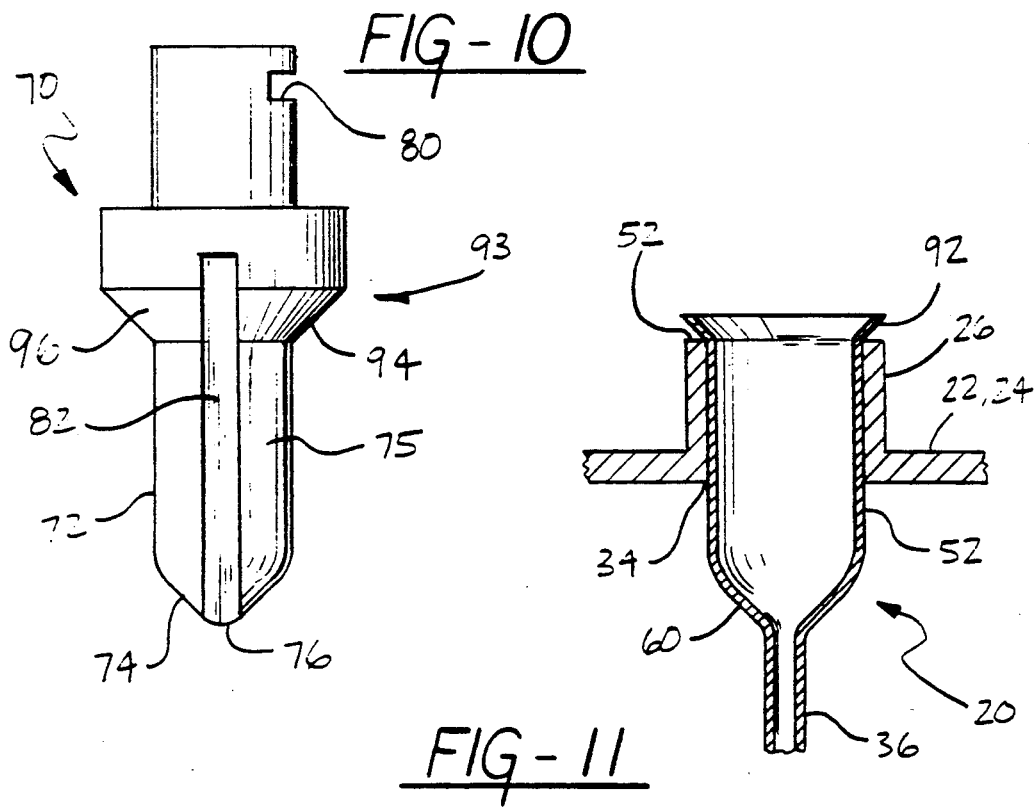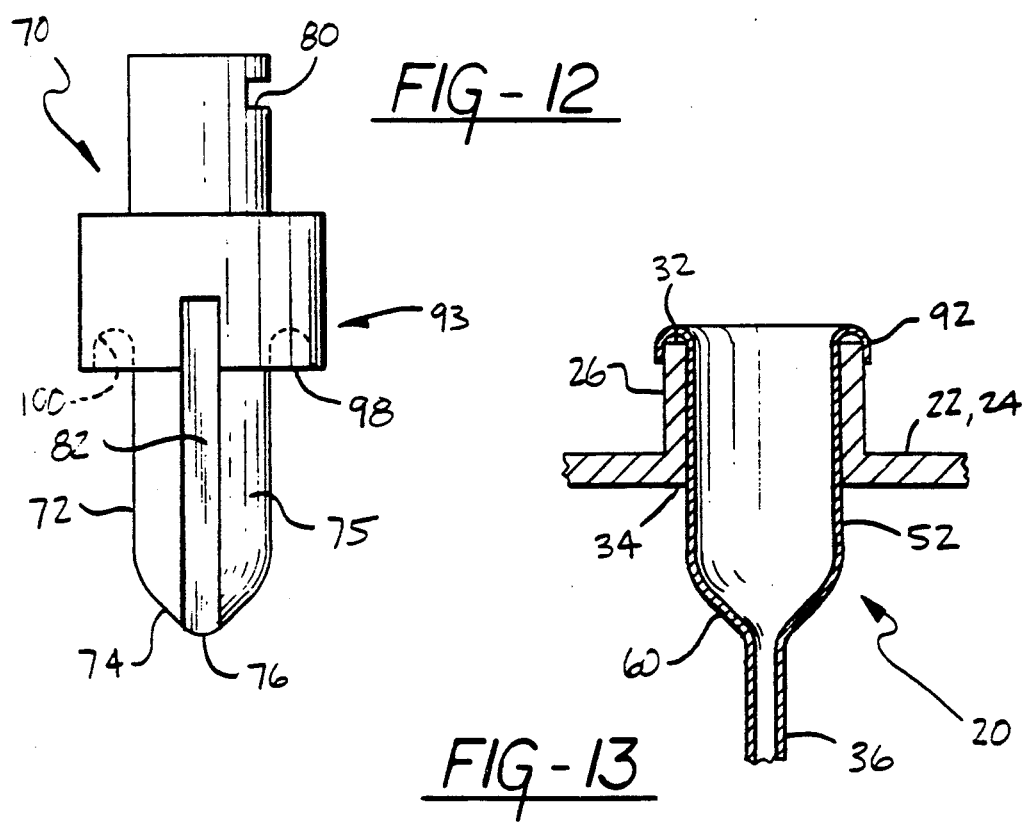

METHOD FOR CONNECTING A COOLANT TUBE AND HEADER OF A HEAT EXCHANGER

TECHNICAL FIELD

The subject invention relates generally to heat exchangers, and more specifically, to connecting a coolant tube to a header of a heat exchanger.

BACKGROUND ART

Commonly known in the art are heat exchangers used in connection with an automotive vehicle for cooling the engine of the vehicle. The heat exchanger generally comprises an upper and lower manifold providing fluid reservoirs and a plurality of coolant tubes extending between the manifolds and providing fluid communication therebetween. Coolant passing through the upper and lower manifolds and coolant tubes is maintained at substantially elevated temperatures and pressures under normal operating conditions. A fluid impervious connection must be established between the ends of the coolant tubes and the manifolds to prevent the high pressure coolant from leaking through the interface. Generally, this pressure impervious connection is formed peripherally between end portions of the coolant tubes which are received in corresponding collar openings in each of the manifolds.

For example, the U.S. Pat. No. 4,744,505 to Calleson, issued May 17, 1988, discloses a method for connecting the end portion of a coolant tube to the header wall of a heat exchanger. Calleson generally discloses expanding the end portion of the coolant tube into the collar opening in the header wall to create a tight fit therebetween. However, the Calleson teaching is deficient in that the expansion process is incomplete leaving an annular opening between the collar opening and an unexpanded remaining portion of the tube. This opening must be filled to complete the seal with extensive amounts of solder, weld or the like, to create a fluid impervious and high pressure resistant seal between the tube and collar. The additional step required to fill the opening is time consuming and de to the large annular opening filled between the collar and tube the filler material has a tendency to break loose over time thus permitting leakage.

The U.S. Pat. No. 4,546,824 to Melnyk, issued Oct. 15, 1985, and assigned to the assignee of the subject invention discloses a similar coolant tube to header connection. Each of the tubes include a circular end portion received in a respective collar openings of the header. Each tube end portion is expanded to engage the collar opening and form a fluid impervious seal therebetween. The tubes shown in the Melnyk disclosure are of typical construction in that a seam of overlapping and interlocking material extends the length of each tube. Although the seamed tubing is an economical and efficient method of producing such tubing in large quantities, the thickness of the seam creates problems when the end portion of the tube is expanded to create a peripheral seal with the collar opening. Particularly, a conically tapered flaring tool is used to expand the tube end portion. Because the flaring tool has a circular cross section along its length, the thick seam prevents the wall portions of the tube immediately adjacent the seam from being properly expanded into the collar opening to perfect an adequate seal. As a result of the incomplete seal, the openings left between the collar opening and the tube adjacent the seam, likewise must be filled with extensive amounts of solder, or other similar filling material and as stated previously, the extensive filling material filling the opening has a tendency to break loose over time and result in leakage.

The U.S. Pat. No. 4,455,917 to Michael et al, issued Jul. 17, 1984 discloses a typical prior art flaring tool for expanding the end portion of the coolant tube against the collar opening of the header in a heat exchanger.

SUMMARY OF THE INVENTION

In accordance with the present invention there is provided a heat exchanger apparatus comprising a manifold having an opening for conveying fluid therethrough, a coolant tube having a substantially uniform wall thickness and an axially extending mechanical seam having a seam thickness greater than the wall thickness and a predetermined seam width, the coolant tube being disposed through the manifold opening. The apparatus further comprises a flaring tool having tapered side surfaces for forcibly expanding the coolant tube into frictional force fit engagement with the manifold opening to establish a force fit frictional seal therebetween. The apparatus is characterized by including a groove extending axially along the side surface of the flaring tool and having a groove width slightly wider than the seam width for straddling the seam during the forcible expansion of the coolant tube to force the portions of the wall adjacent the seam outwardly and into force fit sealing contact with the manifold opening.

The present invention further provides a method of connecting a coolant tube to a manifold in a heat exchanger comprising the steps of; inserting a coolant tube having an axially extending mechanical seam into an opening in a manifold, inserting a flaring tool into the coolant tube, and forcibly expanding the walls of the coolant tube into frictional force fit engagement within the manifold opening to establish a force fit frictional seal therebetween. The method is characterized by forcing the portions of the wall immediately adjacent the seam outwardly into force fitting frictional contact with the manifold opening.

FIGURES IN THE DRAWINGS

Other advantages of the present invention will be readily appreciated as the same becomes better understood by reference to the following detailed description when considered in connection with the accompanying drawings wherein:

FIG. 3 is a top view of an unexpanded tube;

FIG. 4 is a perspective view of the tube of FIG. 3 inserted in a collar opening of the header and shown in cross-section;

FIG. 5 is a top view of FIG. 4;

FIG. 6 is a perspective view of a prior art flaring tool inserted in the tube of FIG. 4;

FIG. 7 is a top view of the prior art flaring tool as taken along line 7—7 of FIG. 6;

FIG. 8 is a perspective view of the flaring tool according to the subject invention shown inserted in the tube of FIG. 4;

FIG. 9 is a top view of the subject flaring tool as taken along line 9—9 of FIG. 8;

FIG. 10 is a front view of the subject flaring tool;

FIG. 11 is a fragmentary cross-sectional view of the tube and the header as connected and sealed by the subject invention;

FIG. 12 is a front view of an alternative embodiment of the subject flaring tool including a rolling apparatus; and FIG. 13 is a fragmentary cross-sectional view of a tube and header connection formed by the alternative flaring tool of FIG. 12.

DETAILED DESCRIPTION OF THE DRAWINGS

Figure 1:
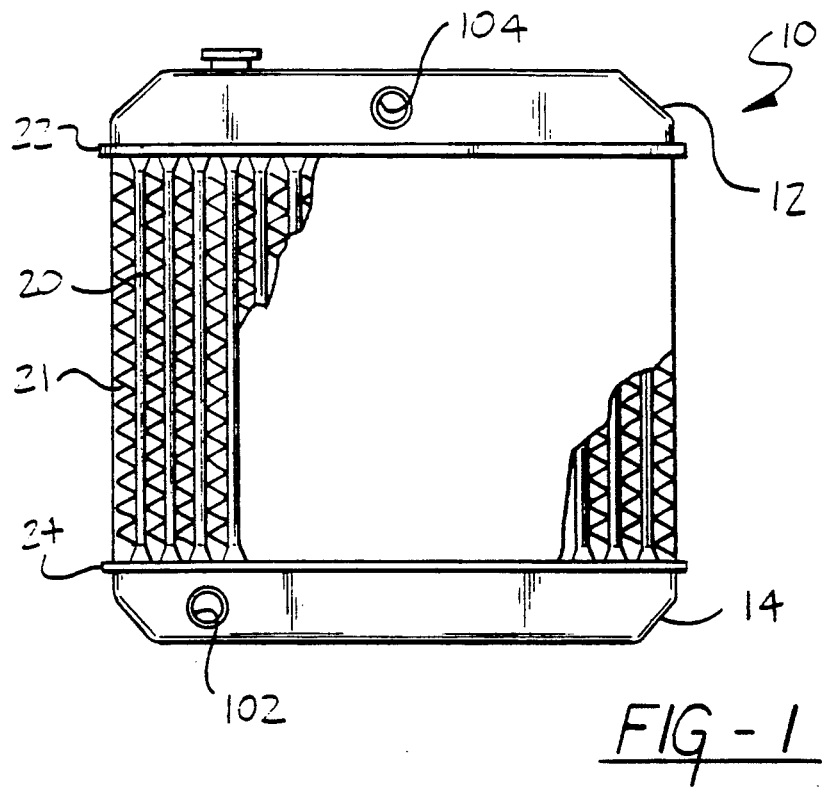
FIG. 1 is a front elevational view of a heat exchanger according to the subject invention.
Figure 2:
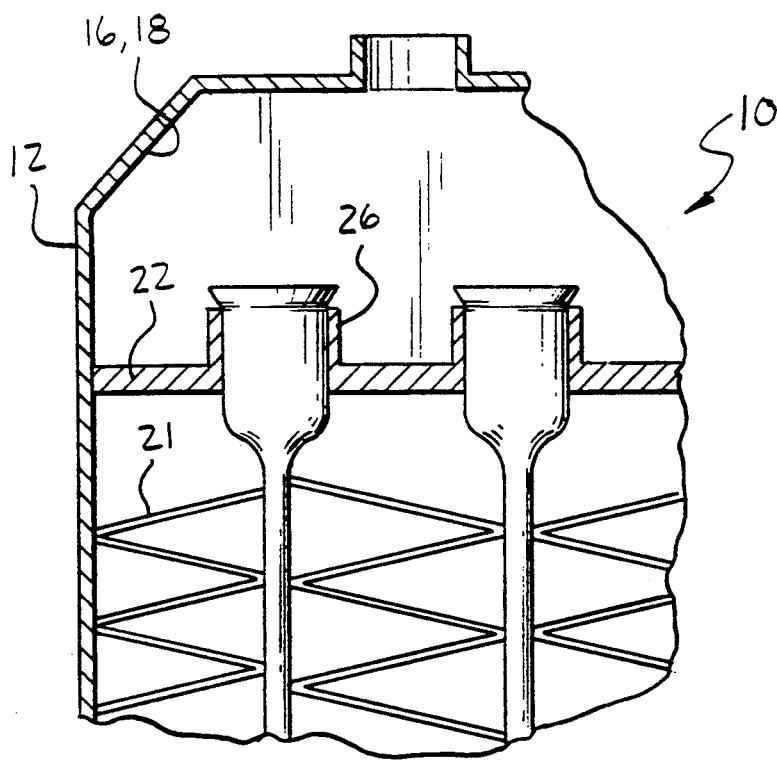
FIG. 2 is a fragmentary cross-sectional view of the tube to header connection according to the subject invention.
Figure 1:
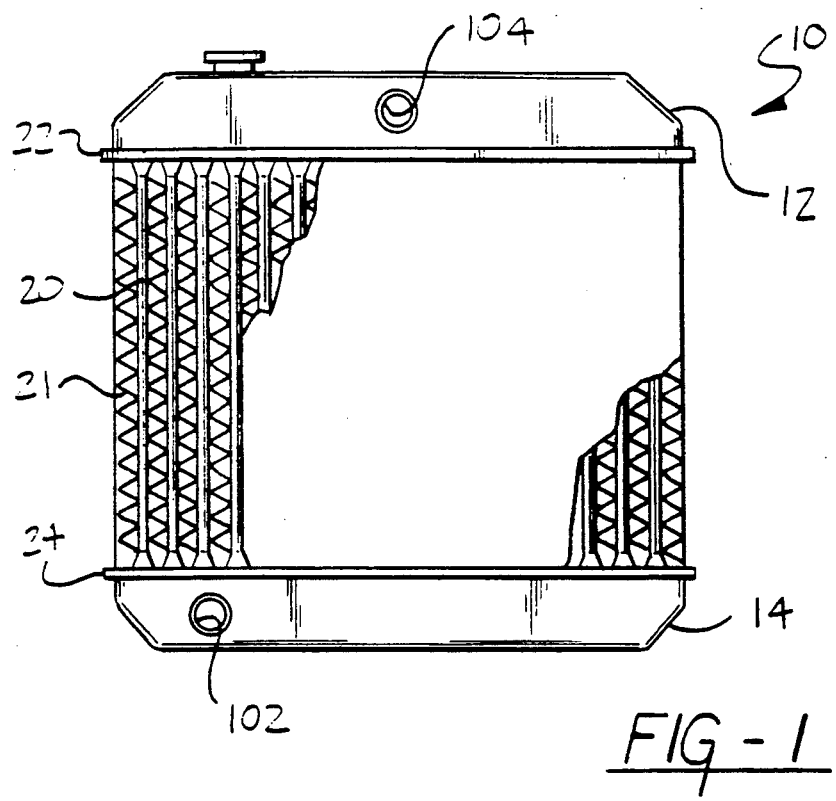
Figure 2:
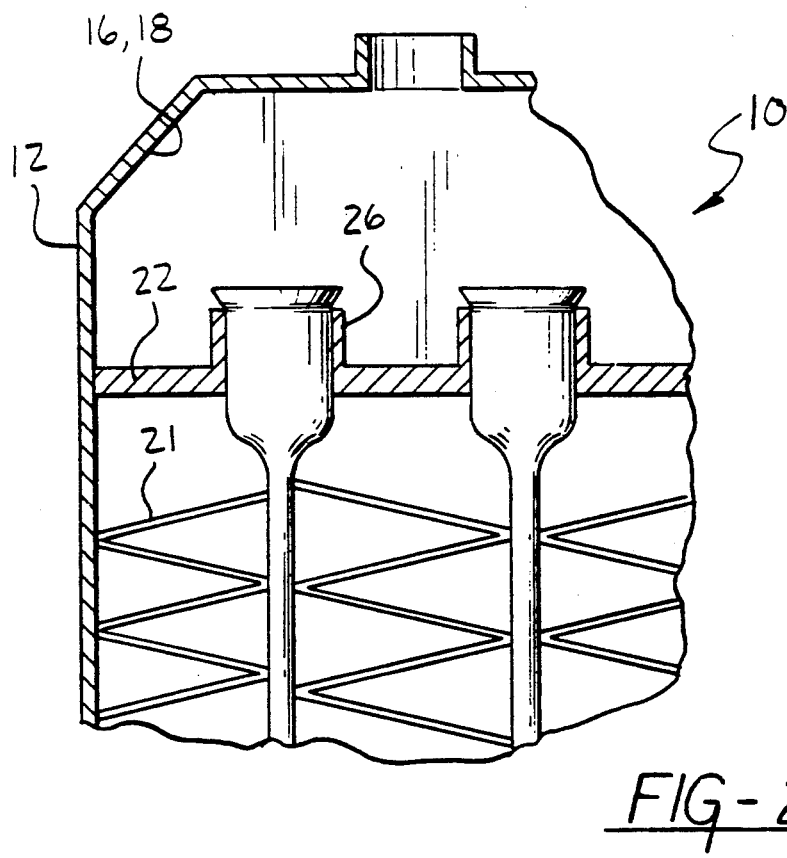

Referring the Figures, wherein like numerals indicate like or corresponding parts throughout the several views, a heat exchanger of the type commonly used in connection with an automotive vehicle is generally shown at 10. The heat exchanger 10 comprises an upper 12 and lower 14 manifold providing upper 16 and lower 18 fluid reservoirs respectively, a plurality of coolant tubes 20 extending therebetween, and a plurality of fins 21, generally formed of thin metallic sheets, extending between the tubes 20 in a step like manner. The fluid reservoirs 16, 18 define an area generally referred to as the liquid side of the heat exchanger 10 and the area about the tubes 20, external to the fluid reservoirs 16, 18, defines an area generally referred to as the air side of the heat exchanger 10.

Each manifold 12, 14 comprises a header wall 22, 24 closing the fluid reservoirs 16, 18 and creating a fluid barrier between the liquid side and air side of the heat exchanger 10. The header wall 22, 24 is formed of a generally thin metallic sheet and comprises a plurality of collars 26 extending radially outwardly into the fluid reservoirs 16, 18 within the manifolds 12, 14, that is, into the liquid side of the heat exchanger. Each collar 26 defines a generally cylindrical manifold or collar opening 28 providing a fluid passageway between the reservoirs 16, 18 and coolant tubes 20. The collar openings 28 include an inner circumferential surface 30 on outer circumferential surface 31, an upper circumferential edge 32, and a lower circumferential edge 34 adjacent the air side of the heat exchanger 10. It will be appreciated that the collar openings 28 may differ in shape other than cylindrical, i.e., elliptical, ovular etc.

The coolant tubes 20 are formed by rolling a thin layer of sheet metal, having a substantially uniform wall thickness T, into a generally longitudinal flat sided tube-shaped member. The tube may be formed into any suitable shape, i.e., cylindrical, elliptical or the like. The preferred embodiment comprises a tube having a longitudinal body portion 36 having generally flat side surfaces 38, 40 and arcuate side walls 42, 44. The tubes 20 include a first 46 and second 48 edge which are locked, fastened or sealed together along one side 38, 40, 42, 44 to form an axially extending mechanical seam 50 extending the length of the longitudinal tube 20.

As shown in FIGS. 3 and 4, the seam 50 is formed by bending the first 46 and second 48 edges generally 180° forming a hook or U-shaped portion. The edges 46, 48 are interlocked by positioning the edges 46, 48 adjacent one another such that the first edge 46 is received and locked in the U-shaped portion formed by the second edge 48 and likewise, the second edge 48 is received and locked in the U-shaped portion formed by the first edge 46. As shown, the overlapping portion of the tube wall forms a seam thickness greater than the tube wall thickness T. More specifically, the thickness of the seam 50 equals four times 4T the thickness of the tube wall T. The seam 50 has a seam width $W_1$ formed by the length of the bent U-shaped portions. It will be appreciated that a seam 50 may be formed by other means such as welding or fastening the edges 46, 48 together. The seam 50 is further fixedly or rigidly secured by brazing the overlapping edges 46, 48 together by solder, or the like, to create a firmly connected rigid seam 50 in the tube 20.

The coolant tubes 20 further include cylindrical deformable hollow end portions 52. The end portions 52 comprise a slightly smaller diameter than the diameter of the cylindrical collar openings 28 and thus can be readily received therein, FIG. 4. The end portions 52 include an inner 54 and outer 56 circumferential surface and a circular upper edge 58. The end portion 52 is received in the collar opening 28 and in fluid communication with the fluid reservoir 16, 18 and manifold 12, 14. The upper edge 58 of the tube 20 further extends above the upper edge 32. The tube 20 further includes a transition portion 60 between the end portion 52 and the longitudinal body portion 36 extending below the lower circumferential edge 34 of the collar 26 providing a smooth fluid passage through the portions 52, 36 of the tube 20.

Referring to FIG. 3, it is a common problem that upon forming the cylindrical end portions 52 of the tubes 20, the seam 50 and portions of the tube wall immediately adjacent the seam 62, 64 may not conform to the circumference of the remaining portions of the tube. That is, the seam 50 and adjacent tube portions 62, 64 may not extending outwardly enough to form a uniform diameter about the circular opening. Likewise, the inner 54 and outer 56 circumferential surface will not be uniformly circular, or uniformly shaped in correspondence with the shape of the collar opening 28. The dotted line in FIG. 3 illustrates the desired circumference of the end portion 52 to form a uniform circumference and corresponding surfaces 54, 56.

As will be appreciated, turning to FIGS. 4 and 5, when the end portion 52 of the tube 20 is inserted in the collar opening 28 of the header wall 22, 24, the outer circumferential surface 56 does not uniformly correspond with the inner circumference surface 30 of the collar opening 28. In other words, the seam 50 and tube wall portions 62, 64 adjacent the seam 50 are somewhat indented with respect to the remaining portions of the tube. As seen in FIG. 5, the gap $G_1$ between the collar opening 28 and the portions of tube wall 62, 64 adjacent the seam 50 is greater than the gap $G_2$ between the collar opening 28 and remaining circumference of the tube 20.

Once the tube 20 is inserted into the collar opening 28, it is desirable to form a fluid tight or fluid impervious seal therebetween. As shown in FIGS. 6 and 7, it is common in the prior art to insert a cylindrical flaring tool 66 into the hollow end portion 52 to expand the end portion 52 outwardly against the inner circumferential surface 30 of the collar opening 28. The flaring tool 66 has a diameter D slightly greater than the diameter of the end portion 52 and thus forcibly deforms or expands the tube wall outwardly when inserted in the end portion 52. However, as best shown in FIG. 7, the outer peripheral surface of the flaring tool 66 directly contacts the seam 50. Since the seam 50 has a thickness 4T greater than the thickness T of the tube wall, and further since the seam 50 is a rigid non-deformable seam, the tool 66 contacts the rigid seam 50 without extending to the portions of tube adjacent the seam 62, 64. The tool 66 then contacts the remaining portions of the tube to expand the end portion 52 into engagement with the collar 26. Thus, as indicated in FIG. 7, a gap $G_3$ remains between the inner circumferential surface 30 of the collar opening 28 and the portions 62, 64 of the tube wall adjacent the seam 56. As can be appreciated, the gap $G_3$ allows fluid to pass from the fluid reservoirs 16, 18 into the air side of the heat exchanger 10, thus resulting in failure of the heat exchanger 10.

The prior art has previously attempted to further seal the tube 20 and collar opening 28 by brazing the collar 28 and tube 20 together with extensive amounts at solder, or the like, and thereby fill the gap $G_3$. However, as can be appreciated, a soldering process between two surface requires a small tolerance or gap therebetween to result in a solid, fixed connection. The gap $G_3$ does not provide a close tolerance and therefore the solder tends to fail, resulting in leakage of the coolant fluid.

Referring to FIGS. 8 and 9, the subject invention includes a flaring tool as generally shown at 70. The flaring tool 70 comprises a longitudinal body portion 72 having tapered side surfaces 74 and a distal end 76. A portion 75 of the tapered side surfaces 74 is generally cylindrical and includes a uniform diameter $D_2$. The portion 75 tapered inwardly along the side surfaces 74 to the rounded distal end 76. The flaring tool 70 diameter $D_2$ is slightly greater than the diameter of the hollow end portion 52. An operating means 78 receives and interconnects with the flaring tool 70 by a locking key 80. The locking key 80 positions the tool 70 with the operating means 78 such that the flaring tool 70 aligns for insertion into the hollow end portion 52 and collar opening 28. The operating means 78 extends the flaring tool 70 such that the distal end is received in the end portion 52 of the tube 20. The tapered side surfaces 74 of the body portion 72 contact the inner circumferential surface 54 of the portion 52 to forcibly expand the outer circumferential surface 56 of the end portion 52 of the coolant tube 20 into a frictional force fit engagement with the inner circumferential surface 30 within the collar opening 28 of the header wall 22, 24. The distal end 76 of the tool 70 extends into the tube 20 to conform with the transition portion 60 and thus, the tapered side surfaces 74 and the surface 75 of the body portion 72 expand the end portion 52 of the tube against the entire inner surface 30 of the collar 26 causing frictional force fit contact and sealing between the tube 20 and collar 26 from the upper edge 32 to the lower edge 34.

The subject invention is characterized by the flaring tool 70 including a groove 82 extending axially along the side surface 74 from the distal end 76 along the body portion 72. The groove 82 has a groove width $W_2$ slightly wider than the seam width $W_1$. The groove 82 aligns with and receives the seam 50 and further straddles and surrounds the seam 50 during insertion of the tool 70 in the hollow end portion 52. The groove 82 forces portions 62, 64 of the tube wall adjacent the seam 50 outwardly and into force fit sealing contact with the collar opening 28 and thus provides a force fit frictional seal between the tube 20 and header wall 22, 24.

The groove 82 comprises a pair of side walls 84, 86 extending radially along opposite sides of the seam 50 and a face portion 88 interconnecting the side walls 84, 86. The face portion 88 contacts with the inner surface of the seam 50 to press or expand the seam 50 outwardly against the collar 26. The tool 70 has a first diameter $D_1$ measured from the face portion 88 at the groove 82. The side walls 84, 86 extended the side surface 74 of the tool 70 outwardly to a second diameter $D_2$ to contact and expand the tube wall of the end portion 52. As shown in FIG. 9, the side walls 84, 86 of the groove 82 are immediately adjacent the opposite sides of the seam, or more specifically, the side walls 84, 86 are no further away from the sides of the seam 50 than the thickness (T) of the tube wall. In other words, the groove width $W_2$ is greater than the seam width $W_1$ by no more than twice the tube thickness (T), and preferably less.

Furthermore, the portions 62, 64 of the tube 20 immediate adjacent the seam 50 may be more specifically defined by the portions 62, 64 of the tube being within a distance (T), the tube wall thickness, or less, from the side of the seam 50, and extending outwardly therefrom. As shown in FIG. 9, the portions 62, 64 adjacent the seam 50 are denoted by the areas marked X. Thus, the groove 82 straddles and surrounds the seam 50 and allows the tool side surface 74 to extend to diameter $D_2$ and contact the portions 62, 64, forcibly expanding the portions 62, 64 outwardly against the inner circumferential surface 30 of the collar 26. As shown, a portion 90 of the tube 20 adjacent the second tube edge 48 bends around, in an S-shaped manner, the outer U-shaped portion formed by the first tube edge 46. The degree of bend in the portion 90 varies radially depending upon the dimensions of the groove 82. Thus, as shown in the preferred embodiment, if the face portion 88 is parallel or horizontal to the inner surface of the seam 50 and the side walls 84, 86 extend perpendicular and radial from the face portion 88, the portion 90 will become substantial radial to the tube and substantial close a gap $G_4$ between the portion 90 and the outer U-shaped portion of the first tube edge 46. The side walls 84, 86 may, however, be angled relative to the face portion 88 or the groove 82 may be arcuate and curve about the seam 50, resulting in forming the portion 90 with less of a radially slope, thus increasing the gap $G_3$.

As best shown in FIG. 9, the end portion 52 of the tube 20 forms a substantially uniform circular circumference in force fitting engagement with the collar 26. The subject invention may further be distinguished over the prior art by the flaring tool 70 providing a uniform radial force against the entire inner circumference 54 of the tube 20. That is, the contact of the side surfaces 74 of the tool 70 with the tube 20 and the contact of the groove 82 with the seam 50 provides an equal or uniform radial force or pressure about the entire circumference of the tube 20 and collar opening 20. Such a uniform force fit engagement results in a consistent circular frictional fit between the tube 20 and collar 26. As previously shown in the prior art, FIGS. 6 and 7, the radial force or pressure against the tube 20 is greater at the seam 50 and tube portion directly opposite the seam 50. The portions of the tube adjacent the seam 50 receive a smaller force during expansion. This occurs due to the thickness (4T) of the seam 50 being greater than the thickness (T) of the tube wall. The seam 50 is substantially non-deformable and thus receives a greater load of the radial force than the portion of the tube adjacent the seam 50. The prior art thus provides an inconsistent frictional force fit between the tube 20 and collar 26, that is, the contact pressure between the tube 20 and collar 26 is not equally uniform about the respective circumferences.

It will further be appreciated that the tool diameter $D_2$ may be slightly greater than the diameter of the collar opening 28, such that, upon insertion and expansion of the end portion 52, the collar 26 may further be slightly expanded due to the force of the tube wall 20 thereagainst. This expansion equally results in providing a proper frictional force fit seal as the shown preferred embodiment.

Referring to FIGS. 10-13, various methods may be employed to further engage a portion 92 of the tube 20 extending above the upper edge 32 of the collar opening 28 against the collar 26. The flaring tool 70 may further include an upper deforming portion 93 to further expand the portion 92 outwardly, against the upper edge 32 of the opening 28. For example, FIG. 10 discloses the flaring tool 70 further including an outwardly inclined frustum 94 having an inclined flaring surface 96 generally cylindrical about the upper portion of the body portion 72 of the tool 70. The flaring surface 96 extends outwardly from the tool surface 74, 75 to a diameter larger than the tool diameter $D_2$. As shown in FIG. 11, the flaring surface 96 contacts the upper portion 92 of the tube 20 upon insertion of the body portion 72 into the hollow end portion 52. The portion 92 is flared outwardly by the surface 96 and thus is partially crimped against the upper cylindrical edge 58 of the collar opening 28. The flaring of the tube 20 provides a positive locking contact further preventing longitudinal movement between the tube 20 and header 22, 24. The flared portion 92 further provides a funnel for fluid flow from the fluid reservoir 16, 18 into the coolant tube 20.

Similarly, FIG. 12 discloses the flaring tool including a rolling portion 98 having an arcuate rolling surface 100 for rolling the portion 92 of the tube 20 back toward the header wall 22, 24 and about the upper edge 32 of the collar opening 28. The rolling surface 100 extends from the side surface 74 of the tool 70 forming an arcuate channel about the circumference of the tool 70. Upon insertion of the body portion 72 into the hollow end portion 52 of the tube 20, the rolling surface 100 contacts the upper portion 92 of the tube 20 and guides the portion 92 along the arcuate channel thus bending or rolling the portion 92 over and about the upper edge 32 to the outer surface of the collar 26. The rolled surface 92 thus further provides a positive contact lock or preventing longitudinal movement between the tube 20 and header 22, 24. The rolled surface 92 further provides a transitional opening in the tube 20 for fluid communication with the manifold fluid reservoir 16, 18.

The subject invention is further characterized by including a method of connecting the coolant tube 20 to the manifold 12, 14 of the heat exchanger 10. The method includes the steps of; inserting a coolant tube 20 having an axially extending mechanical seam 50 into a circular opening 28 in a manifold 12, 14, inserting a flaring tool 70 into the coolant tube 20 and, forcibly expanding the walls of the coolant tube 20 into a frictional force fit within the manifold opening 28 to establish a force fit frictional seal therebetween. The method is characterized by forcing the portions 62, 64 of the wall 20 immediate adjacent the seam 50 outwardly into force fitting frictional contact with the manifold opening.

More specifically, the method comprises the steps of; inserting the deformable hollow end portion 52 of the tube 20 into the collar opening 28 formed by the collar 26 of the header wall 22, 24, extending the upper portion 92 of the tube 20 above the upper circumferential edge 32 of the collar 26, inserting the distal end 76 and body portion 72 of the flaring tool 70 into the end portion 52 of the tube 20, forcibly expanding the walls of the tube 20 by pressing the side surfaces 74, 75 of the tool 70 outwardly against the inner circumferential surface 54 of the end portion 52 to form a frictional force fit engagement between the outer circumferential surface 56 of the tube 20 and the inner circumferential surface 30 of the collar 26. The method, more specifically, is characterized by forcing the portions 62, 64 of the wall 20 immediate adjacent the seam 50 outwardly into force fitting frictional contact with the inner surface 30 of the collar opening 28 of the collar 26.

The method further includes the step of bonding the coolant tube 20 against the manifold opening 28 by brazing the tube 20 and opening 28 together with solder, or the like to establish a fluid impervious seal therebetween. More specifically, the step further includes bonding the outer surface 56 of the end portion 52 to the inner surface 30 of the collar opening 28 by melting a solder or similar material therebetween and allowing the solder to cool and harden, thus sealing the tube 20 and collar 26 and providing a fluid impervious seal therebetween. The solder material may be layered on the surface of the tubing prior to insertion of the tube 20 into the collar opening 28 and the heated and melted between the surfaces 30, 56 to provide the fluid tight seal.

As previous described, the method may further include flaring the portion 92 of tube 20 extending above the manifold opening 28 outwardly to crimp the portion 92 against the opening 28. The portion 92 is flared outwardly to form an inclined frustum and prevent longitudinal movement between the tube 20 and collar 26. Alternatively, the method may further include rolling the upper portion 92 of the tube 20 about the circumferential edge 32 of the collar opening 28 to surround the periphery of the manifold opening 28.

In operation, the heat exchanger 10 is commonly used in an automotive vehicle to cool the vehicle engine. Coolant fluid stored in the upper 16 and lower 18 fluid reservoirs flows from the upper reservoir 16 or manifold 12 through the collar openings 28 and into the plurality of coolant tubes 20. The fluid is cooled by dispersing air about the air side of the heat exchanger 10. The air is dispersed by passing through the fins 21 and about the body portions 36 of the tubes 20. The flat side surfaces 38, 40 provide a heat transfer surface between the flow of air and the fluid with the tubes 20 and thus the fluid is subsequently cooled. The fluid continues to flow into the lower manifold 14 and lower reservoir 18. The lower manifold 14 has an outlet 102 which connects to a fluid conduit (not shown) to circulate the coolant fluid about the engine (not shown). The coolant fluid returns from the engine and reenters the heat exchanger 10 through an inlet 104 into the upper manifold 12 for recooling and recirculation.

The invention has been described in an illustrative manner, and it is to be understood that the terminology which has been used is intended to be in the nature of words of description rather than of limitation 28.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of connecting a coolant tube (20) to a manifold (12, 14) in a heat exchanger (10) comprising the steps of:

inserting a coolant tube (20) having an axially extending mechanical seam (50) into an opening (28) in a manifold (12, 14):

inserting a flaring tool (70) into the coolant tube (20);

forcibly expanding the walls of the coolant tube (20) into frictional force fit engagement within the manifold opening (28) to establish a force fit frictional seal therebetween;

and characterized by forcing the portions (62, 64) of the wall (20) immediately adjacent the seam (50) outwardly into force fitting frictional contact with the manifold opening (28).

2. A method as set forth in claim 1 further characterized by applying a uniform radial force about the inner circumference (54) of the coolant tube (20) to expand the tube (20), seam (50) and portions (62, 64) of the wall immediately adjacent the seam (50) uniformly against the manifold opening (28).

3. A method as set forth in claim 2 further characterized by brazing the tube (20) and manifold opening (28) together to establish a fluid impervious seal therebetween.

4. A method as set forth in claim 3 further characterized by extending an upper portion (92) of the tube (20) above the manifold opening (28).

5. A method as set forth in claim 3 further characterized by flaring the upper portion (92) of the tube (20) outwardly to crimp the portion (92) against a circumferential edge (32) of the manifold opening (28).

6. A method as set forth in claim 3 further characterized by rolling the upper portion (92) of the tube (20) about a circumferential edge (32) of the collar opening (28) to surround the periphery of the manifold opening (28).

* * * * *